United States Patent [19]

Kullerud

[11] Patent Number: 5,046,571

[45] Date of Patent: Sep. 10, 1991

[54] VERTICALLY ADJUSTABLE WHEEL CHAIR

[76] Inventor: Björn Kullerud, Seierstenv. 4, Dröbak, Norway

[21] Appl. No.: 488,083

[22] PCT Filed: Jan. 6, 1989

[86] PCT No.: PCT/NO89/00004

§ 371 Date: Jul. 3, 1990

§ 102(e) Date: Jul. 3, 1990

[87] PCT Pub. No.: WO89/06118

PCT Pub. Date: Jul. 13, 1989

[30] Foreign Application Priority Data

Jan. 11, 1988 [NO] Norway ................................ 880074

[51] Int. Cl.[5] ................................ B60K 1/00

[52] U.S. Cl. ................................ 180/65.1; 280/640; 280/642; 280/657

[58] Field of Search .................... 180/65.1, 65.2, 907; 280/639, 640, 38, 642, 643, 644, 657; 297/DIG. 4, 330, 338, 346, 339, 345, 347, 348; 248/421; 187/18; 5/81 R

[56] References Cited

U.S. PATENT DOCUMENTS

| | | | |
|---|---|---|---|
| 4,533,106 | 8/1985 | Stöckl | 248/421 |
| 4,614,246 | 9/1988 | Masse et al. | 180/907 |
| 4,712,653 | 12/1987 | Franklin et al. | 187/18 |
| 4,809,804 | 3/1989 | Houston et al. | 180/907 |

FOREIGN PATENT DOCUMENTS

| | | |
|---|---|---|
| 2517418 | 11/1976 | Fed. Rep. of Germany . |
| 3611437 | 10/1987 | Fed. Rep. of Germany . |
| 2090564 | 7/1982 | United Kingdom . |

*Primary Examiner*—Andres Kashnikow
*Assistant Examiner*—Richard Camby
*Attorney, Agent, or Firm*—Fleit, Jacobson, Cohn, Price, Holman & Stern

[57] ABSTRACT

An electrically driven wheel chair for disabled persons wherein a seat support resting on a rigid wheel frame (8) is vertically adjustable by the aid of an electrically driven force transmitting member (12). The seat support comprises an upper frame portion (1) attached to rigid wheel frame (8) via two pairs of scissors-type bars (4,5), each end of the pairs of scissors-type bars being alternately pivotally or pivotally and slidably connected with upper seat support frame (1), and lower rigid wheel frame (8), respectively. Front end (18) of the upper seat support frame (1) is via supporting bars (14,16) and linkage elements connected with wheel frame (8) and simultaneously with pair (5) of scissors-type bars, which is actuated by piston rod (12) to change the height of the seat support. The vertically adjustable support permits an arrangement of footrest and calf support providing continuous change of their position so that the users's legs will have an anatomically correct posture all the time. An additional pair of wheels (19) may be provided on the front portion of the support to take over the contact with the ground from the ordinary pair of front wheels (20) when the seat support is lowered.

8 Claims, 3 Drawing Sheets

VERTICALLY ADJUSTABLE WHEEL CHAIR

BACKGROUND OF THE INVENTION

The present invention relates to an electrically driven wheel chair comprising a vertically adjustable seat support and calf supports with a footrest member, and an extra pair of wheels, said members being connected with said vertically adjustable seat support so as to be actuated and adjusted to a desired position when the seat support is vertically adjusted.

Commonly used wheel chairs, whether electrically driven or not, are not provided with a vertically adjustable seat. But many of them are collapsible, and in this connection reference is made, inter alia, to British Patent Application No. 2,090,564 which relates to a wheel chair the seat frame of which is of a scissors linkage type having two possible positions, i.e. a completely folded, and a completely extended position. Wheel chairs of said kind create a number of problems to the user of the wheel chair. The seat portion of the wheel chair has a vertical position which may possibly be said to form a compromise of various considerations, but which will very often prove to be either too low or too high.

A wheel chair user's activities, e.g. at home, are thus at present limited by the vertical position of the wheel chair. The disabled user will commonly not be able to reach down or close enough to the floor to pick up, e.g. objects which the disabled person has dropped. On the other hand, the wheel chair user will not be at a proper level to carry out tasks, e.g. on a kitchen cabinet, or to reach far enough up into a kitchen wall cupboard. In the bathroom the disabled person in a wheel chair will either sit too low or too high, dependent on the tasks to be carried out. It is often a problem to lie down on a bed because of the difference in level between the wheel chair seat and the bed. For wheel chair users to function in the best possible manner at home, so that they may also be self-reliant to a greater extent, quite extensive changes of various installations in the home are often required. This is especially the case with existing houses or appartments.

For a disabled person's wheelchair, especially an electrically driven wheel chair, to be used for a driver's seat in a larger vehicle, like a delivery van, etc., the vertical position of the wheel chair seat portion at present requires the vehicle floor to be converted, so that the user will be at a correct level relative to various control means of the vehicle. It is desirable to lower the front portion of the vehicle floor to a suitable level, but this is only possible with one or two car makes. Commonly, the supporting structures of a vehicle will prevent conversion which involves lowering of the floor. If it is possible to convert the car in this manner, this will, however, be very expensive, as mentioned above.

In most car makes where it is impossible to lower the total floor area of the front portion of the vehicle, a limited portion of the floor must be lowered, resulting in a well-like cavity in the existing floor. With all the car makes of interest, however, a problem resides in the fact that the chassis of the vehicle with supporting structures does not permit said cavity to be placed at the required short distance to permit the wheel chair user to reach various operating means, like steering wheel, etc. Reconstruction of various operating means will be required to place them closer to the driver. Obviously, the mentioned changes which have to be made on conventional vehicles are very expensive.

Furthermore, from German Patent DE-OS No. 25 17 418 a wheel chair is known the seat portion of which is vertically adjustable at the same time as the angle of inclination of the seat level proper is adjustable. Said adjustment is carried out by the aid of two vertical piston rods which are provided at a mutual distance, and which are at their lower ends mounted on the chair support and at their opposite ends are in contact with the seat portion proper. The wheel chair according to the last mentioned patent publication, obviously, represents a considerable improvement relative to wheel chairs which are not vertically adjustable, and to some extent it partly eliminates some of the disadvantages of wheel chairs that are not vertically adjustable. A considerable disadvantage of the wheel chair according to said patent publication, however, is that the maximum lowering capacity of the seat portion will be limited by the length of the piston rod, which in turn also will determine the distance between the lowermost and the highest position of the seat portion. The greatest disadvantage, however, is the fact that the piston rod prevents extensive lowering of the seat portion. Another considerable disadvantage of the disclosed wheel chair is that two piston rods are required to provide reasonably acceptable stability of the seat portion. This is both bulky and expensive.

Another common aspect of existing wheel chairs is that the user will often find himself in a much lower position than, e.g. a person standing up, in a conversation. This is very unfortunate and may have a restraining effect on communication with other people.

Other disadvantages which may not be directly connected with the vertical position of the wheel chair user in case of conventional, and preferably electrically operated wheel chairs is that they tend to instability when driven on rough ground. Special problems also arise in connection with high kerbstones which the user of a wheel chair meet when driving onto a pavement.

BRIEF SUMMARY OF THE INVENTION

It is an object of the present invention to provide, especially an electrically driven wheel chair where the above disadvantages are eliminated to a maximum degree. One aspect of the invention is to eliminate part of the disadvantages connected with the vertical level of a wheel chair seat. The applicant, thus, sought to provide a wheel chair with a seat which is continuously adjustable in the vertical direction from an extremely low position to a very high position, and where, simultaneously with height adjustment of the seat an adjustment of calf supports with a footrest is achieved, said latter means, thus, being automatically adjusted with the level of the seat. This object is achieved by the aid of a seat support in the shape of two pairs of scissors-type bars, the central portions of which are rotatably interconnected in pairs by the aid of a common shaft, and the arms of which are rotatably and/or slidably attached to a lower frame at their lower ends, and to an upper frame portion at their upper ends, said frame portion forming a support for a seat with accessory means, like operating means, etc., and which in the direction of the front ends of the wheel chair are connected to, inter alia, calf supports with a footrest. The chair is characterized in that the upper frame portion of the seat support is at both sides and preferably at its front half, provided with slide means in which a first set of scissors-type bars is rotatably running, which at the opposite end is rotatably mounted on the wheel shafts of the rear wheels or the lower frame, that upper frame portion also at both sides in its rear portion is rotatably connected with the second set of scissors-type bars, which extend downwards to slidable and rotatable connections with the lower frame proper, and from which said scissors-type bars extend as two orthogonal arms which are finished by a connecting transverse bar which is linked to drive means for movement of said bar, and that the scissors-type bars close to the slides are hinged to a first set of holding bars extending forwards some distance ahead of the front wheels, where they are provided with members, from which a second set of holding bars extends to a hinged connection with the front portion of upper frame portion, and that calf supports with a footrest are attached to said second set.

In a preferred embodiment of the invention the drive means comprises an electrically driven piston rod.

Another aspect of the invention is to provide a wheel chair which can be driven in a relatively stable manner on rough ground. According to the invention this object is achieved by the fact that the supporting arm to which the front wheels are attached is hinged to the wheel chair frame, so that said supporting arm is movable laterally.

Another aspect of the invention is to provide conditions to facilitate driving up onto a pavement or crossing a higher threshold or the like with a wheel chair.

According to the invention this object is achieved by the fact that a pair of wheels having a relatively small radius is provided in such a manner on the front end of the vertically adjustable seat support that said pair of wheels, when the seat support is lowered will take over ground contact from the ordinary pair of front wheels which are, thus lifted slightly from the ground. In order to stabilize the wheel chair when the seat support is at maximum height, which may occur at standstill, said additional wheel pairs are, furthermore, provided in such a manner on the seat support that they are in this position in contact with the upper edge of said supporting arm which is then no longer movable laterally.

BRIEF DESCRIPTION OF THE DRAWINGS

A preferred embodiment of the invention is disclosed in more detail below, with reference to the accompanying drawing, wherein.

DETAILED DESCRIPTION

Figure 2:
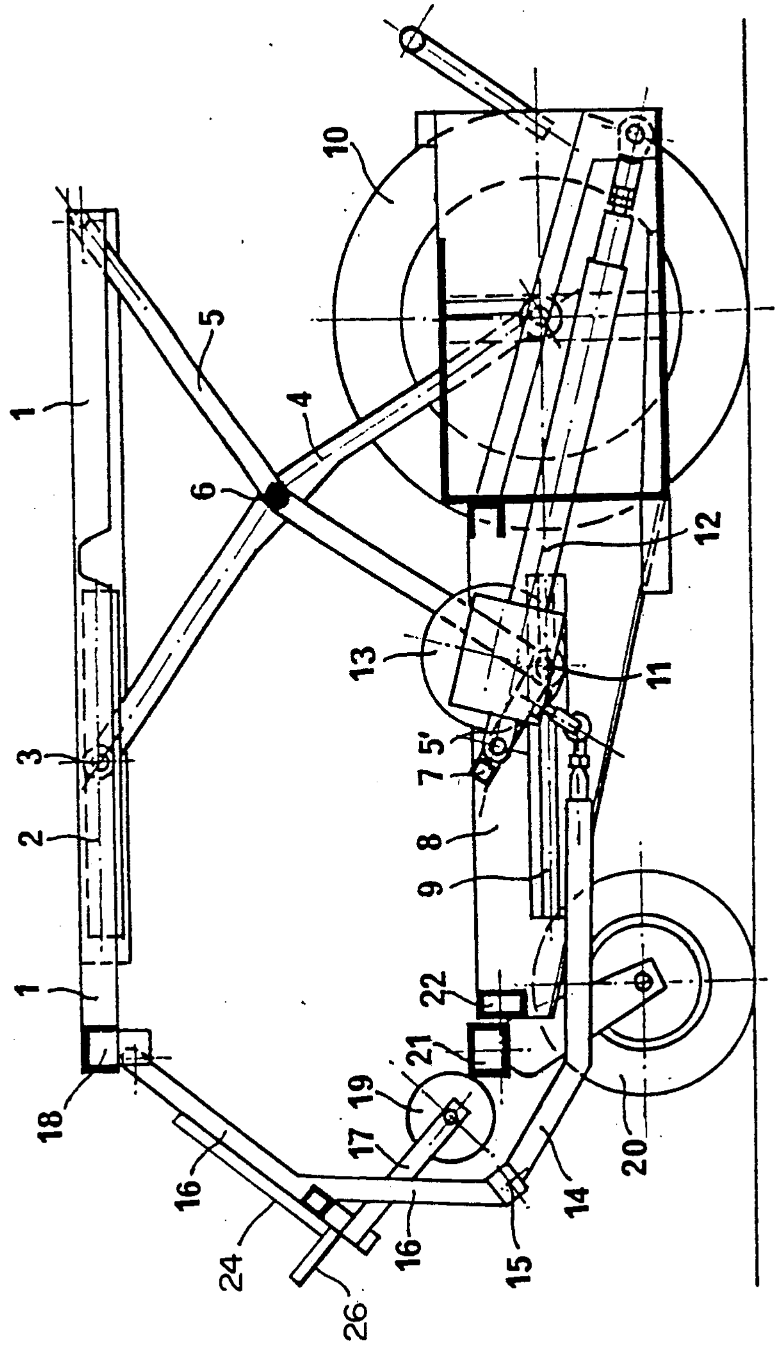
FIG. 2 is a sectional view taken along line A—A' in FIG. 1 with the seat support shown at maximum height.

It will be most practical to start by discussing FIG. 2. The front portion of upper side beams 1 of the seat support is provided with guide rails 2. By the aid of rollers a first set of scissors-type bars 4 runs in said guide rails 2 and is rotatably mounted on the shaft of rear wheels 10. Upper side beams 1 of the support are at their rear ends rotatably connected with a second set of scissors-type bars 5, which, via a common shaft 6 is rotatably connected with, approximately the middle of first mentioned scissors-type bars 4. From shaft 6 the second set of scissors-type bars 5 extends down to the wheel frame proper 8 which is provided with guide rails 9. By the aid of rollers 11 scissors-type bars 5 are slidably connected with guide rails 9. At the location of said slidable connection the scissors-type bars change into sides of an angle 5' extending obliquely upwards and having their end portions connected by a transversal bar 7 which is hinged to a piston rod 12 which is driven by an electromotor 13. Adjacent to slide connections/rollers 11 angle arms 5 are pivoted to a first set of supporting bars 14 which extend slightly ahead of front wheels 20, where said first supporting rods 14, via members 15, change over into a second set of supporting bars 16 which are hinged to upper transverse bar 18 of the seat support. From the second set of supporting bars additional wheel pair 19 is suspended by the aid of angle bars 17. The pair of front wheels 20 is attached to supporting arm 21 which is hinged to transverse beam 22 of wheel frame 8, so that supporting arm 21 is movable laterally. In the drawing calf supports 24 and foot-rest 26 are shown secured to the second set of supporting bars 16.

Figure 1:
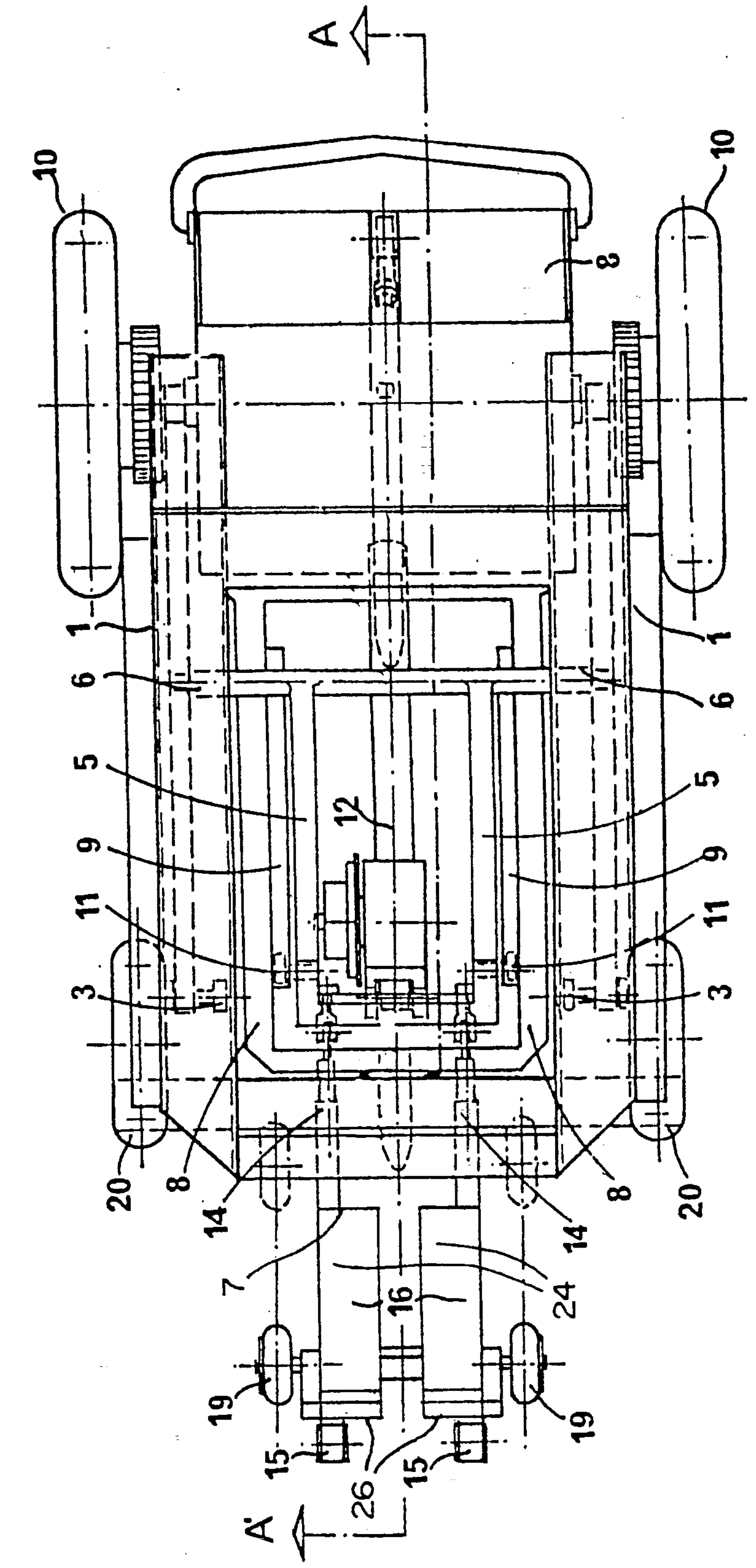
FIG. 1 is a top plan view of the frame with wheels, a vertically adjustable seat support with mounted additional wheel pairs, but not with mounted calf supports and footrest and also shows an electric drive means for vertical adjustment of the seat support, the seat support being shown in a lowered position.

FIG. 1 is provided with numeral references as far as possible, and these numeral references representing the same means as those of FIG. 2, it is considered unnecessary to discuss them in detail.

Figure 3:
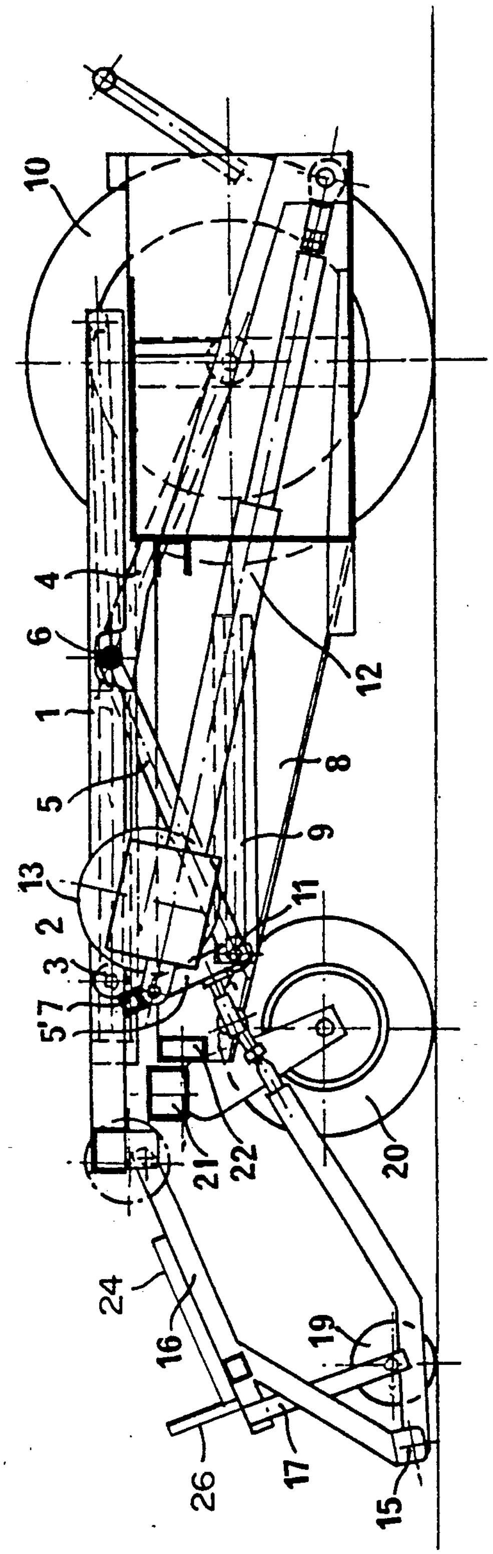
FIG. 3 is a view similar to FIG. 2 with the seat support in the same lowered position as in FIG. 1.

As regards FIG. 3, numeral references are also the same as in FIG. 2. The Figure shows the seat support in a lowered position and clearly illustrates how all members are folded together inside each other to form a very compact unit.

Adjustment of the height of the seat support, like any other operation of the wheel chair is made by the aid of actuating means which are readily accessible to the user sitting in the wheel chair. For raising the seat support motor 13 is activated, and piston rod 12 exerts a pulling force on bar 7. Pair 5 of scissors-type bars which is slidably connected with frame 8 in slide 9 is then pulled rearwards on the frame. At the same time pair 4 of scissors-type bars which is slidably connected with the upper side beam in its slide 2, is pulled rearwards on said side beam 1. In this manner the support is continuously raised into a desired position. The movement of upper part 1 of the support, i.e. the location where the seat is mounted, occurs in the vertical plane and essentially without any movement in the horizontal plane. The seat is, thus, raised straight upwards. Calf supports 24 and footrest 26 are mounted on the upper portion of each supporting bar 16 and, thus, follow the movement of said supporting bars in case of vertical adjustment, which will ensure an anatomically correct posture of the user's legs. In case of maximum height of the support FIG. 2 shows how the additional pair of wheels 19 is in contact with the laterally movable supporting arm 21 of the pair of front wheels 20, which arm is thus locked and can no longer move laterally. This results in increased stability of the wheel chair in this position.

For lowering the seat support, piston rod 12 will push bar 7 and, thus, pairs 4 and 5 of scissors-type bars in their slidable connections in upper beam 1, and frame 8, respectively in a forward direction. Supporting bars 14 and 16 are then slightly "folded" due to hinged connection 15. In a folded position wheel pair 19 contacts with the ground.

I claim:

1. An electrically driven wheel chair comprising:

a lower frame;

a front pair of wheels and a rear pair of wheels rotatably mounted on front and rear wheel shafts on said lower frame;

a pair of laterally spaced lower slide members mounted on said lower frame;

an upper frame;

a pair of laterally spaced upper slide members mounted on said upper frame;

two pairs of laterally spaced scissors-type bars, each pair of said bars comprising a first bar and a second bar pivotally connected at central portions thereof by a common shaft, said first and second bars each having upper and lower ends;

said lower ends of said first bars being pivotally connected to said rear wheel shaft and said respective upper ends of said first bars being pivotally and slidably connected to respective ones of said upper slide members for sliding and pivotal movement relative to said upper frame;

said upper ends of said second bars being pivotally connected to said upper frame and said respective lower ends of said second bars being pivotally and slidably connected to said lower sliding member for sliding and pivotal movement relative to said lower frame;

an extension on said lower end of each said second bar extending upwardly at right angles to the portion of said second bar between said common shaft and said lower end;

an upper end on each said extension;

a transverse bar connecting said upper end of each said extension;

drive means pivotally connected to said transverse bar for moving said transverse bar reciprocally relative to said lower frame;

a first pair of laterally spaced supporting bars pivotally connected to said lower ends of said second bars adjacent said lower slide members and extending to front ends thereof in front of said front wheels;

linkage means on said front ends of said first supporting bars;

a pair of second supporting bars each having one end connected to respective linkage means and the other end pivotally connected to a front portion of said upper frame;

calf supports and a footrest attached to said second supporting bars; and operating means on said upper frame for operating said drive means for raising and lowering said upper frame relative to said lower frame via said scissors-type bars.

2. Wheel chair as claimed in claim 1 wherein:

said drive means comprises an electrically powered piston rod means.

3. Wheel chair as claimed in claim 1 and further comprising:

a supporting arm attached to said pair of front wheels and pivotally connected to said lower frame for lateral movement relative thereto.

4. Wheel chair as claimed in claim 2 and further comprising:

a supporting arm attached to said pair of front wheels and pivotally connected to said lower frame for lateral movement relative thereto.

5. Wheel chair as claimed in claim 1 and further comprising:

an additional pair of wheels rotatably mounted on said second supporting bars and having a wheel radius smaller than the wheel radius of said front wheels, so that when said upper frame is in the lowered position said additional wheels contact the surface on which the wheel chair is operating and said front wheels are raised off of said surface, and when said upper frame is in the raised position said additional wheels contact said supporting arm for preventing lateral movement thereof.

6. Wheel chair as claimed in claim 2 and further comprising:

an additional pair of wheels rotatably mounted on said second supporting bars and having a wheel radius smaller than the wheel radius of said front wheels, so that when said upper frame is in the lowered position said additional wheels contact the surface on which the wheel chair is operating and said front wheels are raised off of said surface, and when said upper frame is in the raised position said additional wheels contact said supporting arm for preventing lateral movement thereof.

7. Wheel chair as claimed in claim 3 and further comprising:

an additional pair of wheels rotatably mounted on said second supporting bars and having a wheel radius smaller than the wheel radius of said front wheels, so that when said upper frame is in the lowered position said additional wheels contact the surface on which the wheel chair is operating and said front wheels are raised off of said surface, and when said upper frame is in the raised position said additional wheels contact said supporting arm for preventing lateral movement thereof.

8. Wheel chair as claimed in claim 4 and further comprising:

an additional pair of wheels rotatably mounted on said second supporting bars and having a wheel radius smaller than the wheel radius of said front wheels, so that when said upper frame is in the lowered position said additional wheels contact the surface on which the wheel chair is operating and said front wheels are raised off of said surface, and when said upper frame is in the raised position said additional wheels contact said supporting arm for preventing lateral movement thereof.

* * * * *